United States Patent
Smith et al.

[15] 3,654,705
[45] Apr. 11, 1972

[54] FLUIDIZED BED VAPOR COMPRESSION DRYING APPARATUS AND METHOD

[72] Inventors: Richard D. Smith, Palo Alto; Dale A. Furlong, Sunnyvale, both of Calif.

[73] Assignee: Combustion Power Company, Inc., Palo Alto, Calif.

[22] Filed: Jan. 11, 1971

[21] Appl. No.: 105,270

[52] U.S. Cl. .................................................. 34/10, 34/57
[51] Int. Cl. .................................................. F26b 3/08
[58] Field of Search .................................. 34/10, 57 A, 57 R

[56] References Cited

UNITED STATES PATENTS

| | | | |
|---|---|---|---|
| 2,213,668 | 9/1940 | Sundos | 34/10 |
| 2,629,938 | 3/1953 | Montgomery | 34/10 |
| 3,040,439 | 6/1962 | Frost | 34/57 A |
| 3,186,102 | 6/1965 | Brodner | 34/57 A |
| 3,212,197 | 10/1965 | Crawford | 34/10 |
| 3,242,974 | 3/1966 | Goulournes | 34/57 A |

*Primary Examiner*—William J. Wye
*Attorney*—Lawrence W. Flynn

[57] ABSTRACT

A feed stream, which is to be dried, is introduced into a fluidized bed of solid particles. A plurality of conduits are immersed in the bed for channeling a heating fluid through the bed to supply heat for vaporizing volatiles contained in the feed stream. Solid particulates and volatiles produced within the hot bed are removed from the bed. Volatiles are separated from the solid particulates entrained therein whereupon dried feed solids are recovered. The separated volatiles are preferably split into a first and a second portion. The first portion is recycled to the bed to serve as the fluidizing gas. The second portion is compressed to a pressure at which its saturation temperature exceeds the boiling temperature of the feed stream at the conditions existing in the bed. The compressed second portion is then cooled to about its saturation temperature whereupon it is re-cycled through the bed heating conduits to serve as the heating fluid. The re-cycled compressed volatiles condense as they pass through these conduits to supply heat for vaporizing the volatiles contained in the feed stream.

25 Claims, 1 Drawing Figure

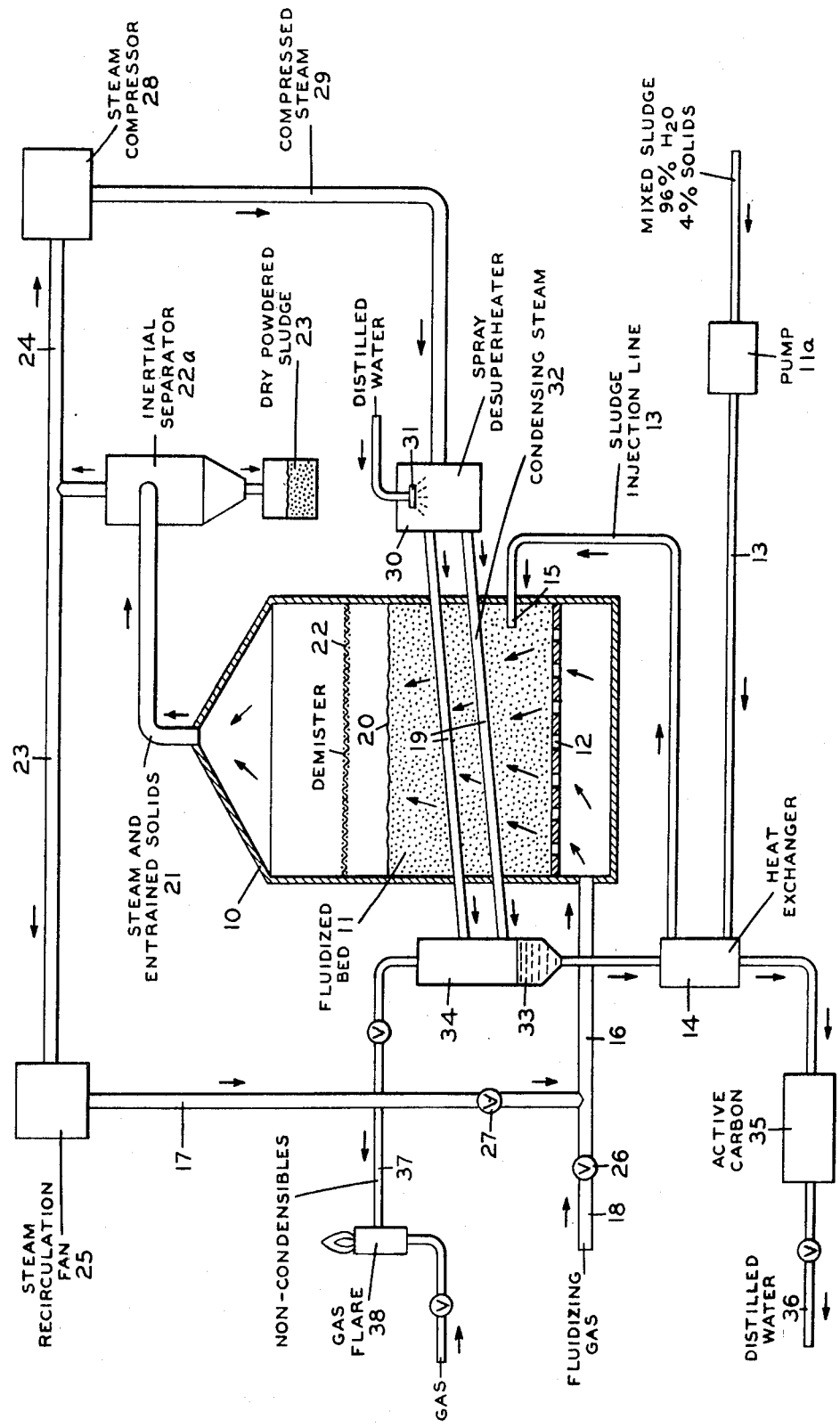

FLUIDIZED BED VAPOR COMPRESSION DRYING APPARATUS AND METHOD

BACKGROUND OF THE INVENTION

In many areas of technology, there is a need for a means for efficiently drying or dehydrating solids which have associated therewith a high liquid content. For example, in the canning industry, peach skins, which could be dried to powder, stored, and later fed to animals are now ground up and fed into sewers, causing an overload of organic pollutants at the local sewage treatment plant. Similarly, surplus fruit or vegetables from bumper crops are now dumped and destroyed. In the field of animal waste, animals are typically fattened in feed lots where thousands of animals generate huge quantities of solid and liquid wastes. Since these wastes cannot economically compete with synthetic fertilizers while in this form, they are left in the open with the run-off from these wastes seriously polluting adjoining streams and waterways. An economical method of converting these wastes to a dry powder which would be useful as fertilizer would solve a serious pollution problem. In the area of sewage treatment, conventional sewage plants remove contaminants from sewage and provide them in the form of a dilute sludge which can contain 95 percent or more water. Economically disposing of this sludge without polluting the environment presents a problem. Inexpensive methods, such as allowing it to dry out in ponds are not sanitary whereas incineration by current methods is quite expensive. A method for drying the sludge to a powder which could be useful as fertilizer, fuel, or a source of active carbon, would be most desirable.

There are several problems associated with trying to remove large amounts of water from solids. The most obvious problem is the tremendous amount of heat required to vaporize the liquid away from the solids. A second problem, especially in the case where the material to be dried contains organic matter, is the organic fouling of heat transfer surfaces which ordinarily will be in direct contact with the material to be dried.

It is a general object of this invention to provide an apparatus and method for drying solids having associated therewith a relatively high liquid content without incurring the disadvantages of previously employed methods.

It is another object of this invention to provide an apparatus and method for efficiently drying materials with minimal heat consumption through the use of a vapor compression technique.

It is another object of this invention to provide an apparatus and method for drying materials which minimizes fouling of heat transfer surfaces through the use of a fluidized bed technique.

It is another object of this invention to provide an apparatus and method for drying materials efficiently through the use of vapor condensation heating and high surface area fluidized beds.

It is another object of this invention to provide an apparatus and method for drying a material which produces as a product a dried powder-like material which can be easily handled, stored, and used in a number of applications.

It is another object of this invention to provide an apparatus and method for drying a material wherein major amounts of water are present which produces an effluent of distilled water and dried powder whereby the distilled water can be conveniently disposed of without presenting a pollution harzard.

It is another object of this invention to provide an apparatus and method for drying a material which employs no fuel or flame and which, therefore, reduces safety hazards.

The above objects are provided by a unique apparatus and method which combine the technology of fluid bed reactors used in the chemical processing industry with the technology of vapor compression distillation used in converting salt water to fresh water.

The fluidized bed is employed to promote rapid evaporation of the liquid associated with the material to be dried by virtue of the large surface area of the bed. The fluidized bed also functions to break up or fragment the dried solid materials into a fine powder by the physical action of the bed whereby removal of the dried product is facilitated by entrainment of the resulting powder in the fluidizing gas. Another advantage of the use of the fluidized bed is that heat transfer surfaces can be immersed within the bed itself and kept continually clean and unfouled by the scouring action produced by the turbulence of the fluidized bed particles.

The purpose of the vapor compression distillation is to reduce the amount of energy required to boil the liquid associated with the material to be dried. For example, using vapor compression technology, the amount of energy required to boil a pound of water can be reduced from about 1,100 BTU to approximately 100 BTU. At the same time, an output stream of distilled water is supplied. Vapor compression also facilitates heat transfer efficiency by making available a recycle stream of saturated vapor which can be employed to heat the bed by condensation of the vapor.

These and other objects of this invention will be apparent to one skilled in the art from a consideration of this entire specification and the drawing attached hereto.

SUMMARY OF THE INVENTION

In accordance with this this invention, a drying apparatus is provided which comprises a chamber and means for supporting a bed of solid particles within the chamber. Means are provided for introducing a feed stream containing a material which is to be dried into the bed disposed in the chamber. Means are also provided for introducing into the bed a gas stream which produces turbulent motion of the bed particles and which also entrains sold particulates produced in the bed by the drying of the feed stream therein. One or more conduits are immersed throughout the bed for channeling a heating fluid through the bed, without the fluid contacting the bed, to thereby supply heat to the bed for vaporizing volatiles contained in the feed stream. As these volatiles are vaporized, the dried feed solids are left behind in the bed as a powder. These solids become entrained in the fluidizing gas and are removed in a stream of volatiles comprising the fluidizing gas and the vaporized feed volatiles.

In operation, volatiles and entrained solid particulates of the feed stream are removed from the bed after the drying step is completed. Means are provided for separating the entrained solid particulates from the volatiles whereby the dried solid particulates are recovered as an output from the apparatus. Means are then preferably provided for splitting the volatiles into a first portion and a second portion. The first portion is re-cycled to the bed where it serves as the gas which maintains the bed in turbulent motion and entrains the solid particulates of the feed (the fluidizing gas). The second portion is fed to a compressor wherein its pressure is elevated to a pressure at which its saturation temperature is greater than the boiling temperature of the feed stream at the conditions existing in the bed. Means are then provided for reducing the temperature of the compressed second portion to about the saturation temperature at the pressure to which it has been compressed. The compressed substantially saturated volatiles are then re-cycled through the heating conduits disposed in the bed where they serve as the heating fluid for the bed. As the compressed volatiles pass through these conduits, they supply heat for vaporizing the volatiles of the feed stream. This heat is supplied by the condensation of the compressed volatiles within the conduits since the volatiles are substantially saturated. The provision of a substantially saturated vapor feed to the heating conduits and the resultant condensation occurring when the vapor gives up its heat to the bed is an import advantage of this invention since heat transfer efficiency is greatly improved as a result of the significantly higher heat transfer coefficients for condensation as opposed to those for cooling a super-heated vapor.

Since the conduit heat transfer surfaces are immersed in the bed, any solid or film-forming material adhering to these surfaces is scoured from the surfaces by the action of the turbulent bed particles. Thus the heat transfer surfaces are kept clean and free from fouling by the action of the bed. Because of the high surface area of the bed particles, heat transfer rates are very high and evaporation of volatiles from the feed is rapid. Solid residues remaining on the bed particles are dislodged and fragmented into a fine powder by the action of the bed particles, these fragmented residues becoming entrained in the bed fluidizing gas and being removed from the bed by this gas along with the feed volatiles present in the chamber.

In accordance with the method of this invention, the feed to be dried is fed to a bed of solid particles maintained in turbulent motion by a gas stream which is introduced into the bed and which also serves to entrain solid particulates produced in the bed when the feed stream is dried therein. A heating fluid is directed through a plurality of conduits which are immersed and disposed throughout the bed whereby volatiles contained in the feed are vaporized. The dry solids of the feed and volatiles are removed from the bed and the solids separated from the volatiles. The volatiles are then preferably split into two portions, one portion of which is re-cycled to the bed as the fluidizing gas and the other portion of which is compressed to a pressure at which its saturation temperature is greater than the boiling temperature of the feed stream at the conditions existing in the bed. The compressed volatiles portion is cooled to about its saturation temperature at the pressure to which it is compressed. It is then re-cycled through the the bed heating conduits to serve as the heating fluid whereby sufficient heat is supplied, by condensation of the re-cycled compressed volatiles, to vaporize volatiles contained in the feed stream.

The apparatus and method of this invention will be described in greater detail hereinbelow in conjunction with the embodiment described in the attached drawing.

BRIEF DESCRIPTION OF THE DRAWING

The drawing is a schematic illustration of a preferred apparatus and process of this invention.

DESCRIPTION OF THE PREFERRED EMBODIMENTS

Referring to the accompanying drawing, it is seen that the drying apparatus of this invention comprises a chamber 10 in which a bed of solid particles 11 is disposed. Bed 11 is supported within chamber 10 by a porous grate 12. A feed stream 13 of a material to be dried is supplied to bed 11 by a suitable pump 11a. Feed stream 13 can be a solution, a slurry, a colloidal suspension, or a broad range of other materials. In general, feed stream 13 comprises one or more non-volatile constituents in either a solid or dissolved form having associated therewith one or more volatile constituents such as, for example, water or an organic solvent. The amount of volatiles contained in feed stream 13 is not critical and can range from as little as about 1 percent to as high as about 99 percent by weight. However, the numerous advantages of the dryer are best utilized with feed streams containing large amounts of volatile constituents. An illustrative feed material as shown in the accompanying drawing, is a mixed sewage sludge containing about 4 percent by weight solids and about 96 percent by weight water. The feed material is preferably pre-heated in heat exchanger 14 to a temperature approximating the boiling point of the feed at the conditions existing in bed 11. Feed 13 is introduced into bed 10 so as to distribute the feed substantially uniformly throughout bed 11. To this end, feed stream 11 can be supplied to bed 11 by a plurality of outlets 15 disposed at appropriate locations throughout bed 11.

Bed 11 is composed of an inert material which is sufficiently hard to prevent it being ground up when the bed is fluidized. The bed particles typically have an average particle size of between about 50 microns and one-eighth of an inch, with the preferred particle size being from about 800 to 1,200 microns. In view of the size of the bed particles, it can be seen that a high surface area is provided in the bed which facilitates efficient and rapid heat transfer to the feed material injected into bed 11. Illustrative bed materials include silica, alumina, silicon carbide, limestone, glass beads, and ceramic particles. A preferred bed material is a number 16 grade silica. The bed material is preferably harder than the dried feed solids produced in bed 11 in order to assist in sub-dividing these solids and in removing them from the heat transfer surfaces of conduits 19. Bed 11 is typically from about 2 to 4 feet thick.

A gas stream 16 is introduced into bed 11 through grate 12 at a sufficient velocity to produce turbulent motion of the particles of the bed and to entrain any solid particulates produced in the bed when the feed stream 13 is dried therein. The fluidizing gas stream 16 may originate from a re-cycle stream 17, as discussed further hereinbelow, or from an independent gas source through conduit 18.

A plurality of pipes 19 are immersed throughout bed 11 and serve to convey a heating fluid through bed 11 to supply sufficient heat for vaporizing the volatiles contained in feed stream 13. Pipes 19 transfer heat to the bed particles; because of the large surface area of the particles and the turbulence present within the bed, heat transfer is very good. Heat is then transferred from the bed particles to the feed 13 injected into bed 11 to produce vaporization of the feed volatiles. Some of the incoming feed material contacts the pipes and heat is transferred directly from the pipes to this material. Any dried solids adhering to the surface of pipes 19 are scoured therefrom by the turbulent action of the bed particles. Thus, the external heat transfer surfaces of pipes 19 are continuously kept clean and free from fouling.

As feed 13 is introduced into bed 11, it is broken into a plurality of small pieces by the turbulent action of the bed. The fragmented feed is contacted by the hot bed particles and volatiles contained therein are vaporized by the heat transferred to the volatiles from the particles. As the volatiles are vaporized, the residue of dried feed solids remaining on the bed particles and on pipes 19 is dislodged and fragmented by the turbulence of the bed particles. In this connection, it is desirable that the dried feed solids be of sufficiently small size to permit their entrainment in fluidizing gas stream 16 or that agglomerates of the dried solids be such that they can be further fractured and ground up by the bed particles to the required size for entrainment.

An effluent stream leaves the upper surface 20 of bed 11 and is withdrawn from chamber 10 through conduit 21. This effluent stream contains the fluidization gas introduced through conduit 16, feed volatiles vaporized in bed 11, and the dried feed solids which are entrained in the fluidizing gas. Since the volatile component of feed 13 is water, the effluent stream will contain substantial amounts of steam. In a preferred embodiment, the fluidizing gas 16 is also steam so that the vapor portion of the effluent stream is essentially saturated steam. In such a case, a superficial steam velocity of 3 to 15 feet per second can be used for the steam leaving the surface 20 of bed 11.

When operating with a feed material of very high moisture content, such as the sewage sludge described hereinabove, it is desirable to provide a demister 22 disposed within chamber 10 above bed 11 to trap and return to bed 11 any liquid droplets which are thrown upward from the surface 20 of bed 11.

The pressure in chamber 10 is maintained at about 20 pisa. Consequently, steam leaving bed 11 is saturated steam at a temperature of about 228° F. The steam and entrained solid particulates of the feed stream pass through conduit 21 and into one or more small diameter high efficiency inertial separators 22a. Separators 22a separate the dried particulate solids from the steam resulting in the collection of almost all the solid particles of size 5 microns and above. This collected dry material is sterile and is recovered in a bin 23 or other suitable recovery means.

The steam leaving separators 22a is split into a first portion 23 and a second portion 24, in about a 50/50 split by weight. The first portion 23 is directed to a recirculation fan 25 and then re-cycled to bed 11 through fluidizing gas introduction conduit 16 where it functions as the bed fluidizing gas. The recirculating fan 25 adds only enough pressure to make up for the loss in grate 12, bed 11 and separators 22a. It is preferred that the bed fluidizing gas be re-cycled steam from bed 11. However, it is not necessary that re-cycle steam be used as the fluidizing gas since an independent source of fluidizing gas could be continuously introduced into bed 11 through conduits 18 and 16. Valves 26 and 27 are provided to permit the use of a re-cycle fluidizing gas 17 or fluidizing gas from an independent source 18. If re-cycle fluidizing gas 17 is not employed, the volatiles leaving separator 22a are not split into two portions 23 and 24.

The second steam portion 24 is fed to steam compressor 28 wherein it is compressed to a pressure of about 29 psia from an inlet pressure of about 20 psia. After compression, the steam is super-heated about 84° F. over its saturation temperature (248° F.) at 29 psia. At this point, the steam is, in effect, super-heated steam. Since it is desirable to employ the heat content of the compressed steam 29 to heat bed 11 by channeling the steam through pipes 19, it is desirable that the compressed steam condense in pipes 19 as it supplies its heat to bed 11. The reason for this is that condensation heat transfer is far more efficient than heat transfer from super-heated steam since heat transfer coefficients are far greater for condensation then for cooling super-heated steam. Accordingly, the compressed steam 29 is cooled to its saturated temperature at 29 psia by passing compressed steam 29 through chamber 30 which contains disposed therein a spray nozzle 31. As steam 29 passes through the chamber 30, distilled water is sprayed into the steam from nozzle 31 to reduce its temperature from about 332° F. to about 248° F., the saturation temperature for steam at 29 psia. To saturate compressed steam 29, approximately 4 percent addition to the mass flow of steam 29 is required. As stated above, the reason for desuper-heating compressed steam 29 is to assure that condensation will occur on the inner surfaces of pipes 19 in bed 11. The de-superheated steam 32 is then conveyed through pipes 19 wherein it condenses to supply heat for vaporizing the volatiles of feed 13. The amount of heat released by the condensation of each pound of steam 32 is about equal to that required to boil each pound of incoming water in feed 13. It is preferrable that the temperature of steam 32 be at least about 2° F. above the boiling temperature of feed 13 at the conditions existing in bed 11. This temperature differential will ordinarily exceed 2° F. and can be as large as desired. A temperature differential of about 20° F. has been found satisfactory.

The steam condensate 33 produced in pipes 19 is withdrawn from pipes 19 and collected in receiver 34. The heat content of this hot condensate 33 is recovered by feeding condensate 33 to heat exchanger 14 wherein it pre-heats feed 13 prior to its injection into bed 11. Feed 13 could also be preheated using any other convenient source of heat.

Condensate 33 is then fed through an activated carbon filter 35 which absorbs any of the volatile organics which has been carried over and dissolved in the condensate. Since the sewage sludge feed 13 contains organic matter, a slight carry over of volatile organics from the feed is to be expected. The carbon treated condensate 36 is distilled water which can be used for many applications such as, for example, as a boiler feed water to make steam. At the very minimum, condensate 36 can be piped into a stream or other body of water as a non-polluting effluent.

Any non-condensibles present in steam 32 will be released in receiver 34 and can be directed through conduit 37 to a small gas flare 38, operating at high temperature, where they are either burned or sterilized at the elevated temperatures.

As can now be seen, the products from the mixed sewage sludge fed to the apparatus of this invention are a dried sterile powder 23 and distilled water 36. The fluidized bed vapor compression drier described hereinabove possesses the capability of drying a wide variety of materials without fouling the heat transfer surfaces of pipes 19. Materials are dried with minimum energy requirements by the expedient of recovering the energy in the vaporized volatiles of the feed stream and employing it to vaporize additional feed volatiles. Extremely high heat transfer rates are obtained by the expedient of employing a high surface area bed, immersing the heat transfer surfaces within the bed so as to provide for continual scouring of the surfaces, and the use of a saturated vapor as the heating fluid in pipes 19. The apparatus is easily automated and requires no fuel or flame.

The embodiments described and illustrated hereinabove are illustrative only and any alterations and modifications thereof apparent to one skilled in the art are deemed to fall within the scope and spirit of the claims appended hereto.

What is claimed is:
1. A drying apparatus comprising:
   1. a chamber;
   2. support means for supporting a bed of solid particles within said chamber;
   3. feed introduction means for introducing into said bed a feed stream which is to be dried;
   4. gas introduction means for introducing a gas stream into the bed disposed in said chamber to produce turbulent motion of said bed particles and to entrain solid particulates produced in said bed by drying of the feed stream;
   5. conduit means disposed throughout said bed for channeling a heating fluid through said bed, without contacting said bed, to supply heat for vaporization of the volatiles in said feed stream;
   6. effluent removal means for removing entrained solid particulates of the feed stream, and volatiles, from said bed;
   7. separator means for separating said entrained solid particulates from said volatiles;
   8. splitting means for splitting said volatiles into a first portion and a second portion;
   9. means for re-cycling said first portion to said gas introduction means where it serves as said introduced gas stream;
   10. compressor means for raising the pressure of said second portion to a pressure at which the saturation temperature of said second portion is greater than the boiling temperature of the feed stream at the conditions existing in said bed;
   11. temperature reduction means for reducing the temperature of said compressed second portion to about the saturation temperature at the pressure to which said second portion is compressed; and
   12. means for recycling said compressed second portion through said conduit means where it serves as said heating fluid, said heating fluid condensing as it passes through said conduit means to supply heat for vaporizing the volatiles of said feed stream.
2. The apparatus of claim 1 wherein said separator means is an inertial separator.
3. The apparatus of claim 1 wherein said temperature reduction means comprises a chamber through which said compressed second portion passes, and means disposed in said chamber for injecting into said second portion a liquid spray.
4. The apparatus of claim 3 further including means for preheating said feed stream, prior to its introduction into said bed, with the condensed recycled second portion discharged from said conduit means.
5. The apparatus of claim 4 further including means for removing impurities from said condensed recycled second portion.
6. The apparatus of claim 4 further including demister means disposed in said chamber for returning to said bed liquid entrained in the effluent from said bed.
7. The apparatus of claim 4 wherein the volatiles of said feed stream comprise water and wherein said first and second portions comprise steam.

8. The apparatus of claim 4 wherein the pressure to which said second portion is compressed corresponds to a saturation temperature of at least 20° F. greater than the boiling temperature of the feed stream at the conditions existing in said bed.

9. A dryer apparatus comprising:
1. a chamber;
2. support means for supporting a bed of sold particles within said chamber;
3. feed introduction means for introducing into said bed a feed stream which is to be dried;
4. gas introduction means for introducing a gas stream into the bed disposed in said chamber to produce turbulent motion of said bed particles and to entrain solid particulates produced in said bed by drying of the feed stream;
5. conduit means disposed throughout said bed for channeling a heating fluid through said bed, without said fluid contacting said bed, to supply heat for vaporization of the volatiles in said feed stream;
6. effluent removal means for removing entrained solid particulates of the feed stream, and volatiles from said bed;
7. separator means for separating said entrained solid particulates from said volatiles;
8. compressor means for raising the pressure of said volatiles to a pressure at which the saturation temperature of said volatiles is greater than the boiling temperature of the feed stream at the conditions existing in said bed;
9. temperature reduction means for reducing the temperature of said compressed volatiles to about the saturation temperature at the pressure to which said volatiles are compressed; and
10. means for recycling said compressed volatiles through said conduit means where it serves as said heating fluid, said heating fluid condensing as it passes through said conduit means to supply heat for vaporizing the volatiles of said feed stream.

10. A drying apparatus comprising:
1. a chamber;
2. support means for supporting a bed of solid particles within said chamber;
3. a bed of solid particles supported by said support means, said particles having an average particles size of between about 50 microns and about one-eighth inch;
4. feed introduction means for introducing into said bed an aqueous feed stream which is to be dried;
5. gas introduction means for introducing steam into the bed to produce turbulent motion of said bed particles and to entrain solid particulates produced in said bed by drying of the feed stream;
6. a plurality of conduits substantially uniformly disposed throughout said bed for channeling a heating fluid through said bed, without said fluid contacting said bed, to supply heat for vaporization of the water in said feed stream into steam;
7. effluent removal means for removing steam and entrained solid particulates of the feed stream from said bed;
8. separator means for separating said entrained solid particulates from said effluent steam;
9. splitting means for splitting said effluent steam into a first portion and a second portion;
10. means for recycling said first portion to said gas introduction means where it serves as the steam introduced into the bed;
11. compressor means for raising the pressure of said second portion to a pressure at which the saturation temperature of said second portion is greater than the boiling temperature of the feed stream at the conditions existing in said bed;
12. temperature reduction means for reducing the temperature of said compressed second portion to about its saturation temperature at the pressure to which said second portion is compressed;
13. means for recycling said compressed second portion through said conduits where it serves as said heating fluid, said heating fluid condensing as it passes through said conduits to supply heat for vaporizing the water in said feed stream; and
14. means for pre-heating said feed stream, prior to its introduction into said bed, with the condensed recycled second portion discharged from said conduits.

11. The apparatus of claim 10 wherein said temperature reduction means comprises a chamber through which said compressed second portion passes and means disposed in said chamber for injecting into said second portion a liquid spray.

12. The apparatus of claim 11 further including means for removing impurities from said condensed recycled second portion.

13. The apparatus of claim 11 further including means for recovering said separated entrained solid particulates of said feed stream.

14. The apparatus of claim 11 wherein said bed particles are a silica having an average particle size of about 800 to 1,200 microns.

15. The apparatus of claim 14 wherein said feed stream is a sewage sludge containing more than about 95 percent by weight water.

16. A method for drying a material which comprises:
1. providing a bed of solid particles;
2. introducing a material to be dried into said bed as a feed stream;
3. introducing into said bed a gas stream to produce turbulent motion of said bed particles and to entrain solid particulates produced in said bed by drying of the feed stream;
4. providing conduits disposed throughout said bed;
5. directing a heating fluid through said conduits to supply heat for vaporization of the volatiles in said feed stream;
6. removing entrained solid particulates of the feed stream and volatiles from said bed;
7. separating said entrained solid particulates from said volatiles;
8. compressing said separated volatiles to a pressure at which the saturation temperature of the volatiles is greater than the boiling temperature of the feed stream at the conditions existing in said bed;
9. reducing the temperature of said compressed volatiles to about the saturation temperature at the pressure to which said volatiles are compressed; and
10. recycling said compressed volatiles through said conduits, where said volatiles serve as said heating fluid, said volatiles condensing as they pass through said conduit means to supply heat for vaporizing the volatiles of said feed stream;

17. The method of claim 16 further including the step of splitting the separated volatiles into a first and a second portion, prior to the compression step, introducing the first portion into said bed to produce turbulent motion of the bed particles and to entrain said solid particulates, and compressing said second portion as in step (8) of claim 16.

18. The method of claim 17 wherein the temperature of the compressed volatiles is reduced by spraying a liquid into said compressed volatiles.

19. The method of claim 18 further including the step of pre-heating the feed stream, prior to its introduction into said bed, with the condensed recycled compressed volatiles discharged from said conduits.

20. The method of claim 17 wherein said bed particles have an average particle size of about 50 microns to one-eighth inch.

21. The method of claim 20 wherein said particles are selected from the group consisting of silica, alumina, silicon carbide, limestone, and glass beads.

22. The method of claim 21 wherein said particles are a silica having a particle size of about 800 to 1,200 microns.

23. The method of claim 17 wherein the saturation temperature of the compressed volatiles recycled to said conduits is at least 2° F. higher than the boiling temperature of the feed at the conditions existing in the bed.

24. The method of claim 17 wherein said gas introduced into said bed to produce turbulent motion of said bed particles is steam and wherein said volatiles in said feed stream comprise water.

25. The method of claim 17 wherein said feed stream is a sewage sludge containing more than about 95 percent by weight water.

* * * * *

UNITED STATES PATENT OFFICE
CERTIFICATE OF CORRECTION

Patent No. 3,654,705  Dated April 11, 1972

Inventor(s) Richard D. Smith et al.

It is certified that error appears in the above-identified patent and that said Letters Patent are hereby corrected as shown below:

Col. 2, line 34, "sold" should be -- solid --;

Col. 2, line 71, "import" should be -- important --;

Col. 4, line 66, "pisa" should be -- psia --;

Col. 5, line 30, "then" should be -- than --

Col. 5, line 47, "preferrable" should be -- preferable --;

Col. 7, line 8, "sold" should be -- solid --;

Col. 7, line 44, "particles" (second occurrence) should be -- particle --;

Col. 8, line 53, ";" should be -- . --.

Signed and sealed this 8th day of August 1972.

(SEAL)
Attest:

EDWARD M. FLETCHER, JR.
Attesting Officer

ROBERT GOTTSCHALK
Commissioner of Patents